United States Patent [19]

Wehner et al.

[11] Patent Number: 5,310,216

[45] Date of Patent: May 10, 1994

[54] FLAT SEW PATTERN PASSENGER AIR BAG

[75] Inventors: Mark F. Wehner, Raunheim am Main, Fed. Rep. of Germany; Michael J. Lachat, Macomb Township, Macomb County, Mich.

[73] Assignee: AlliedSignal Inc., Morristown, N.J.

[21] Appl. No.: 968,809

[22] Filed: Oct. 30, 1992

[51] Int. Cl.⁵ .............................. B60R 21/16
[52] U.S. Cl. ..................................... 280/743 R
[58] Field of Search ............ 280/743, 728 R, 743 R; 493/186, 405, 916, 940

[56] References Cited

U.S. PATENT DOCUMENTS 4,003,588  1/1977  Oka et al. ........................ 280/743
4,169,613  10/1979  Barnett .......................... 280/743 R
5,022,675  6/1991  Zelanak, Jr. et al. ............... 280/743

FOREIGN PATENT DOCUMENTS 2409069  9/1974  Fed. Rep. of Germany ...... 280/743

Primary Examiner—Karin L. Tyson
Attorney, Agent, or Firm—Markell Seitzman

[57] ABSTRACT

An air bag (20) formed of a woven panel of material comprising a main panel portion (22) having straight parallel sides (42), a first neck portion (24) extending from a first end (26) of the main panel portion and a second neck portion (28) extending from an opposite or second end (30) of the main panel portion having straight edges, the air bag sewn together using only straight line sew patterns.

5 Claims, 2 Drawing Sheets

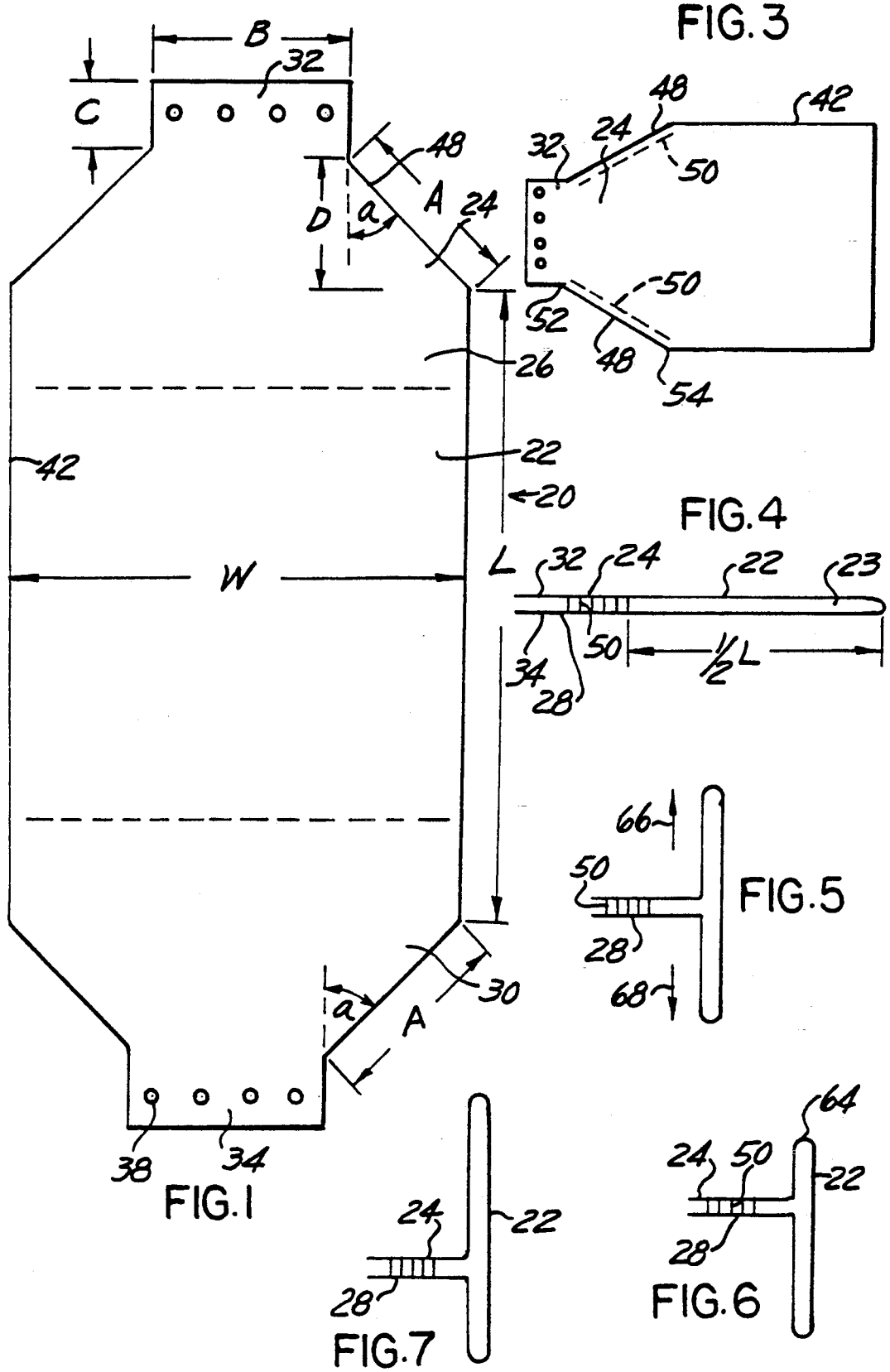

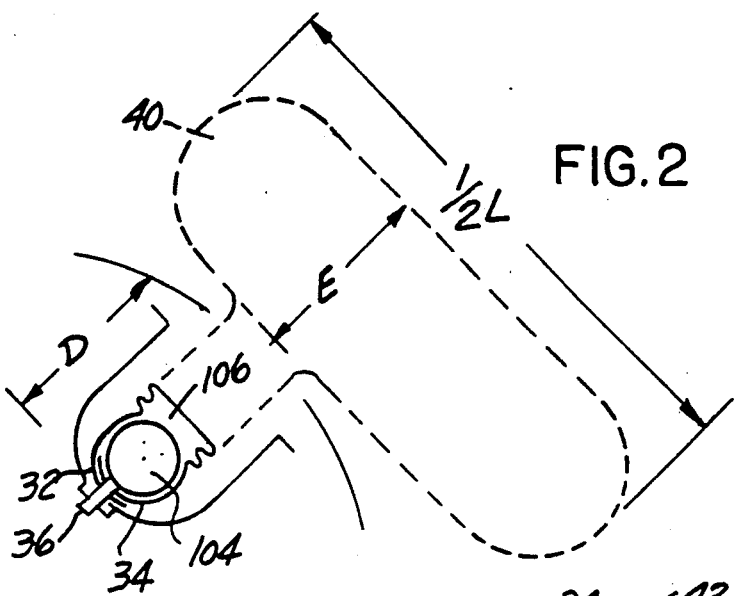
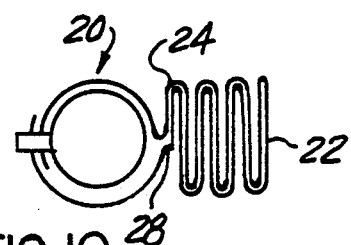
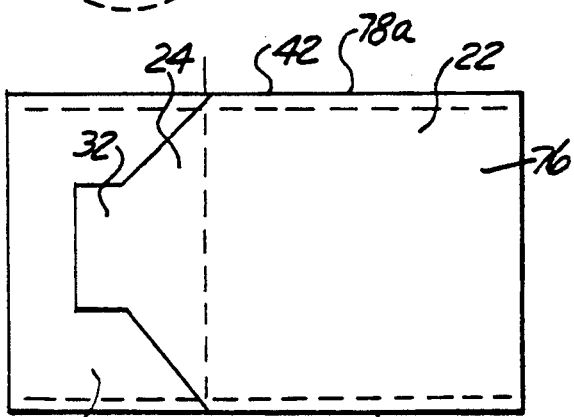
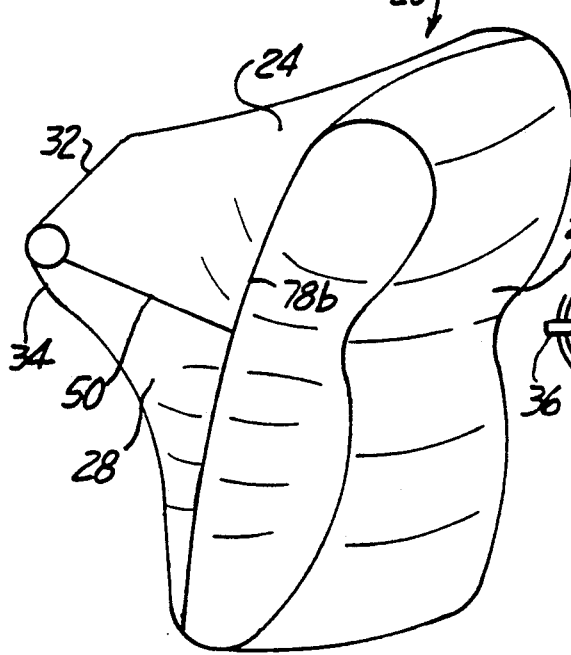
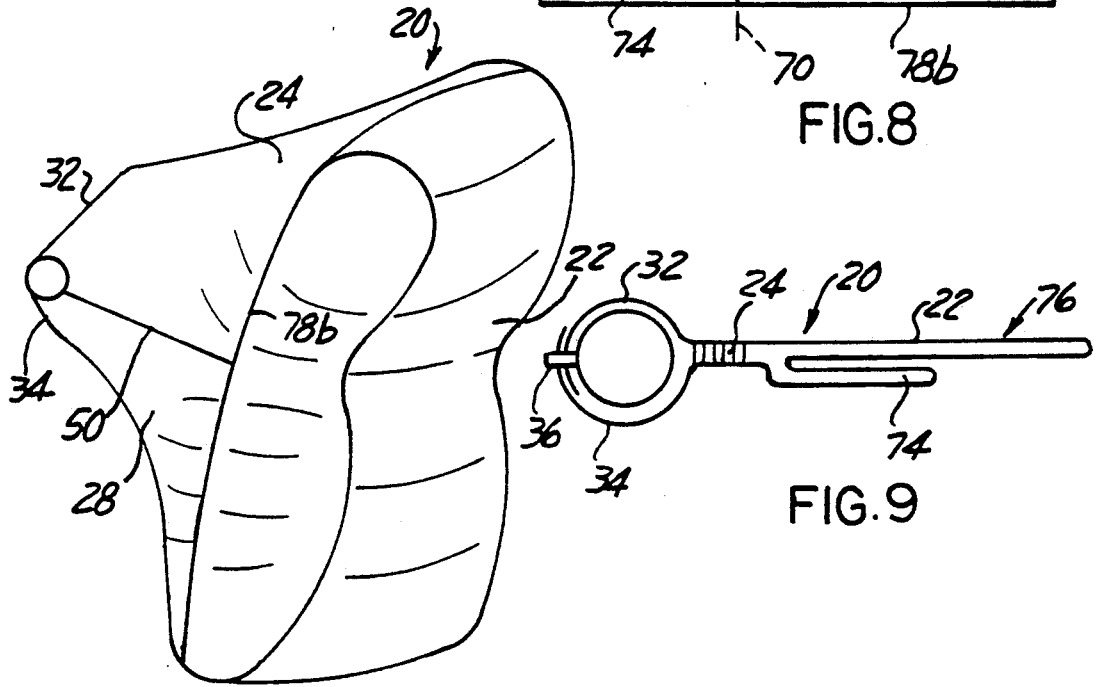

FLAT SEW PATTERN PASSENGER AIR BAG

BACKGROUND AND SUMMARY OF THE INVENTION

The present invention relates generally to inflatable restraint systems for automotive vehicles and more particularly to a passenger air bag that utilizes flat sewing seams.

U.S. Pat. No. 5,022,675 illustrates a passenger side air bag that is manufactured from a large main panel and two curved or arcuately shaped side panels. As can be appreciated, the side sew seams that connect the main panel to each of the side panels are also curved. In production, it is necessary to align the edges of the main panel and each side panel prior to their being sewn together. Thereafter, the aligned seams are typically twisted in one manner or another and laid flat and then sewn. The utilization of an air bag having the curved side panels creates a substantial amount of waste material from the larger sections of air bag material from which these panels are cut. In addition, the curved sew seams necessitate a more complicated and time consuming sewing process.

It is an object of the present invention to provide an air bag in which material utilization is improved and one that is capable of being sewn by automated sewing machines.

Accordingly, the invention comprises an air bag formed from a panel of woven material, the panel comprising a main panel having straight parallel sides, a first neck portion extending from a first end of the main panel portion and a second neck portion extending from an opposite or second end of the main panel portion, a first flap extending outwardly from the first neck portion and a second flap extending from the second next portion. The first neck portion and second neck portion are positioned in an overlapping, registered relationship and sewn together along mating first and second sides of the first neck portion and second neck portion. The respective first ends proximate respective ends of the main panel portion of the sewn together first and second neck portions are positioned along a predetermined line of the main panel portion forming a loop in the main panel with a first length of material of the main panel extending away from one side of the line and a second length of material extending away from the other side of the line with edges of the first and second lengths of material aligned and the sewn together neck portions laid flat on one of the first or the second length of material and the aligned edges sewn together.

Many other objects and purposes of the invention will be clear from the following detailed description of the drawings.

BRIEF DESCRIPTION OF THE DRAWINGS

In the drawings:

FIG. 1 illustrates a plan view of a partially assembled air bag.

FIG. 2 illustrates the air bag mounted within a reaction can or housing to a vehicle.

FIGS. 3-8 illustrate the air bag in various stages of completion.

FIG. 9 illustrates an air bag mounted about a gas generator.

FIG. 10 illustrates an air bag with an accordion pleat fold.

FIG. 11 illustrates an air bag in its inflated configuration.

DETAILED DESCRIPTION OF THE DRAWINGS

FIG. 1 illustrates a single piece air bag 20 laid flat prior to fabrication. The air bag panel comprises a main panel 22, a first neck panel 24, extending from one end 26 of the main panel and a second neck portion 28 extending from an end 30 of the main panel. The main panel 22 is preferably of integral construction but can be pieced to increase fabric utilization in which case the main panel could be formed of three or more pieces shown by the dotted lines crossing the main panel in FIG. 1. Extending from the first neck portion is a first flap 32 and extending from the second neck portion is a second flap 34. Reference is briefly made to FIG. 2 which diagrammatically illustrates a typical top mount orientation of an air bag within a vehicle. FIG. 2 schematically illustrates an instrument panel 100. Situated below the instrument panel is a reaction can or housing 102 typically used to support a gas generator generally shown as 104. An air bag 20 is shown in a folded pre-deployment orientation with the flaps 32 and 34 positioned in an overlapping orientation about a plurality of fasteners 36 typically used to attach the gas generator to the housing 102. In this orientation the various openings 38 formed in each of the flaps 32 and 34 have been secured about a corresponding one of the fasteners 36. Upon deployment of the air bag the air bag will extend outwardly a dimension D generally measured from inside of the reaction can 102 to the instrument panel 100 After the air bag is thrust forward past the instrument panel it expands to its inflated orientation generally shown in phantom line as 40. Returning to FIG. 1, as can be seen, the width W between the flat parallel sides 42 and 44 of the main panel 22 has a dimension W. The width of the main panel is chosen so that in its fully inflated orientation as shown in FIG. 1, the air bag provides a sufficient depth E between the forward face 46 of the air bag and the instrument panel to properly cushion the Occupant. Also shown in FIG. 1, each of the sides 48 of the first and second neck portions 24 and 28 has a length A. In addition, the width B of each flap 32 and 34 is chosen approximately equal to the length of the cylindrically shaped gas generator 104 and the length C of the flaps is chosen to provide sufficient material to enable the air bag flaps to envelope the gas generator as shown in FIG. 2. The axial projected length D of the neck side 48 can be seen to be equal to $D = \cos(a)$ and as related in FIG. 2, the dimension D is the neck length of the air bag, such length sufficient to permit the bag to extend forwardly past the instrument panel or similar structure and inflate. The length of the main panel corresponds to approximately one half the desired inflated height of the air bag.

Having chosen the various dimensions of the air bag 20, the air bag is assembled as follows. The first neck portion 24 is overlaid upon the second neck portion 28 with the various sides 48 of each portion aligned and registered one to the other and laid flat. This relationship is illustrated in FIG. 3. The sides 48 of each of the neck portions 24 and 28 are sewn together, the sew seam illustrated by numeral 50. The sew seams extend from one end 52 proximate the junction of each respective side 48 with end 54 proximate the intersection of sides 48 and the flat sides 42 of the main panel 22. FIG.

4 illustrates a diagrammatic plan side view of this partially completed air bag.

As can be seen, after joining the first and second neck portions, the main panel 22 forms a loop 23 having an effective length of one half of the length L of the main panel 22. It is now necessary to position the sewn together neck portions relative to the main panel to accommodate for the desired mounting arrangement of the air bag within the vehicle. As an example, if the gas generator, air bag and associated components are positioned in what is called a mid-mount orientation within the vehicle, then it may be desirable that the sewn together neck portions 24 and 28 be positioned symmetrically with regard to the main panel 22, such situation illustrated in FIG. 5. If however, the air bag is to be used in a top mount configuration similar to that illustrated in FIG. 2, it may be desirable to position the sewn together neck portions assymetrically relative to the main panel 22 more toward the top 64 of the main panel as illustrated in FIG. 6. Finally, if the air bag is to be used in what is called a low mount configuration, the relationship between the sewn together neck portions and the main panel 22 is shown in FIG. 7. To achieve any of the orientations in the above figures, the ends 54 defining the transition between the sides 48 of each neck portion and the flap side 42 of the main panel is moved relative to the main panel such as indicated by arrow 66 and 68 shown in FIG. 5. Essentially these ends are positioned along an imaginary though predetermined line 70 in the main panel 22 as shown in FIG. 8. Thereafter, either the first or the second neck portion 24 or 28 respectively, is laid flat upon the main panel 22 with the edges 42 of the main panel in an aligned, registered relationship. FIG. 8 is illustrative of the orientation of the flattened air bag with the second neck portion 28 lying upon the material which generally will form the bottom 74 of the air bag. It should be appreciated that the sewn together neck portions can be oriented oppositely than as illustrated in FIG. 8, such that the first neck portion 24 will lie flat against the material forming the top 76 portion of the air bag. Thereafter, the edges 42 of the looped main panel 22 are sewn together along the parallel sew seams 78a and 78b. Thereafter, the air bag is turned right side out, ready for attachment to the gas generator 104.

As can be appreciated, the present invention provides for an air bag which is relatively compact and as such one that can be easily folded into a compact volume. This is primarily due to the elimination of the large side panels used in the prior art which needed to be tucked inwardly to reduce the width of the folded air bag to be approximately equal to the length of the gas generator. When these large side panels were tucked inwardly, they created many layers of material in the folded air bag so that a compact folded configuration could not be achieved. FIG. 9 shows an air bag mounted about a cylindrical structure which may be the gas generator 104 or a cylindrical shell, as known in the art, about which the air bag may be mounted. This can be appreciated from the figure, each of the layers of fabric compactly lie one against the other, facilitating the folding of the air bag. In FIG. 9 the material forming the bottom 74 portions of the main panel 22 has been moved beneath the material forming the top 76 portions of the main panel prior to folding. FIG. 10 shows the air bag folded with an accordion pleat fold. FIG. 11 illustrates the inflated shape of the air bag 20. As can be seen, the sew seam 50 is positioned slightly towards the top of the air bag, as is the case of the top mounted air bag system. The sew seams 50 of the sewn together neck portions intersects the sew seam 78a and 78b closing the sides of the main panel. The sew seams 50 of the sewn together neck portions will restrict the inflated shape of the air bag such as to cause a reduction in the air bag size in the general vicinity of the line connecting the two sew seams 50 on either side of the air bag. In this manner, the neck portion sew seams 50 function as a tether controlling the shape and trajectory of the air bag as it inflates.

Many changes and modifications in the above described embodiment of the invention can, of course, be carried out without departing from the scope thereof. Accordingly, that scope is intended to be limited only by the scope of the appended claims.

We claim:

1. An air bag (20) formed from a panel of woven material, the panel comprising:
    a main panel portion (22) having straight parallel sides (42),
    a first neck portion (24) extending from a first end (26) of the main panel portion and
    a second neck portion (28) extending from an opposite or second end (30) of the main panel portion,
    the first neck portion (24) and the second neck portion (28) positioned in an overlapping, registered relationship and sewn together at first and second sew lines along mating first and second sides (48) of the first neck portion and second neck portion to define a joined neck portion,
    respective first ends (54) of the joined neck portion proximate respective ends of the main panel portion, positioned along a predetermined line (70) in the main panel portion defined by the first and second ends of the main panel portion positioned in an overlapping, registered relationship, the remaining parts of the main panel portion forming a single loop adjacent the predetermined line, the joined neck portion being laid flat. On the single loop with the predetermined line intermediate ends of the single loop and the aligned edges of the main panel portion are sewn together along third and fourth sew lines such that upon inflation of the air bag the joined neck portion extends away from the main panel portion and intersects a plane cutting through the single loop generally along the third and fourth sew lines.

2. The device as defined in claim 1 wherein the first and second sides are straight.

3. The device as defined in claim 1 wherein the predetermined line is positioned at the middle of the main panel.

4. The device as defined in claim 1 wherein the predetermined line is positioned to one side of the middle of the main panel.

5. A air bag (20) formed of a woven panel of material comprising a main panel portion (22) having straight parallel sides (42), a first neck portion (24) extending from a first end (26) of the main panel portion and a second neck portion (28) extending from an opposite second end (30) of the main panel portion having straight edges, were in the first and second neck portions are sewn together along overlapping straight edges and wherein the main panel portion is folded over and sewn together along registered portions of the straight parallel sides forming a single loop with the sewn together neck portion extending outwardly and away from the folded and sewn main panel portion wherein upon inflation the first and second neck portions and their corresponding sewn together straight edges extend outwardly away from a plane containing the sewn together edges of the main panel portion of the air bag.

* * * * *